United States Patent [19]
Bossons et al.

[11] 3,730,356
[45] May 1, 1973

[54] ARTICLE PRESENTING APPARATUS
[76] Inventors: Walter Howard Bossons, c/o Thrissell Works, Eaton Road, Bristol; David George Parker, 21, Westhall Road, Warlingham; George Davey Burcher, c/o Molins Limited, Haw Lane, High Wycombe, all of England
[22] Filed: May 5, 1971
[21] Appl. No.: 140,508

[52] U.S. Cl. ..............................214/1 BC, 214/1 BV
[51] Int. Cl. ..............................................B65g 29/00
[58] Field of Search ...............214/1 BH, 1 BV, 1 BC, 214/1 BD

[56] References Cited
UNITED STATES PATENTS
2,016,814  10/1935  Ferguson ...........................294/64 R
3,124,065  3/1964  Bozek ..............................214/1 BH FOREIGN PATENTS OR APPLICATIONS
1,172,110  11/1970  Germany...........................214/1 BH Primary Examiner—Gerald M. Forlenza
Assistant Examiner—George F. Abraham
Attorney—Craig, Antonelli & Hill

[57] ABSTRACT

Records are presented to inspection devices by feeding each record in turn to one of four members which supports the record from below so that its upper surface may be inspected, the members being carried on a first head intermittently rotatable in 90° steps. After three such steps from the feeding position the record is transferred to one of four further members which supports the record from above so that its lower surface may be inspected, the further members being carried on a second head driven in synchronism with the first head. After two 90° steps of the second head the record is released from the further member.

11 Claims, 7 Drawing Figures

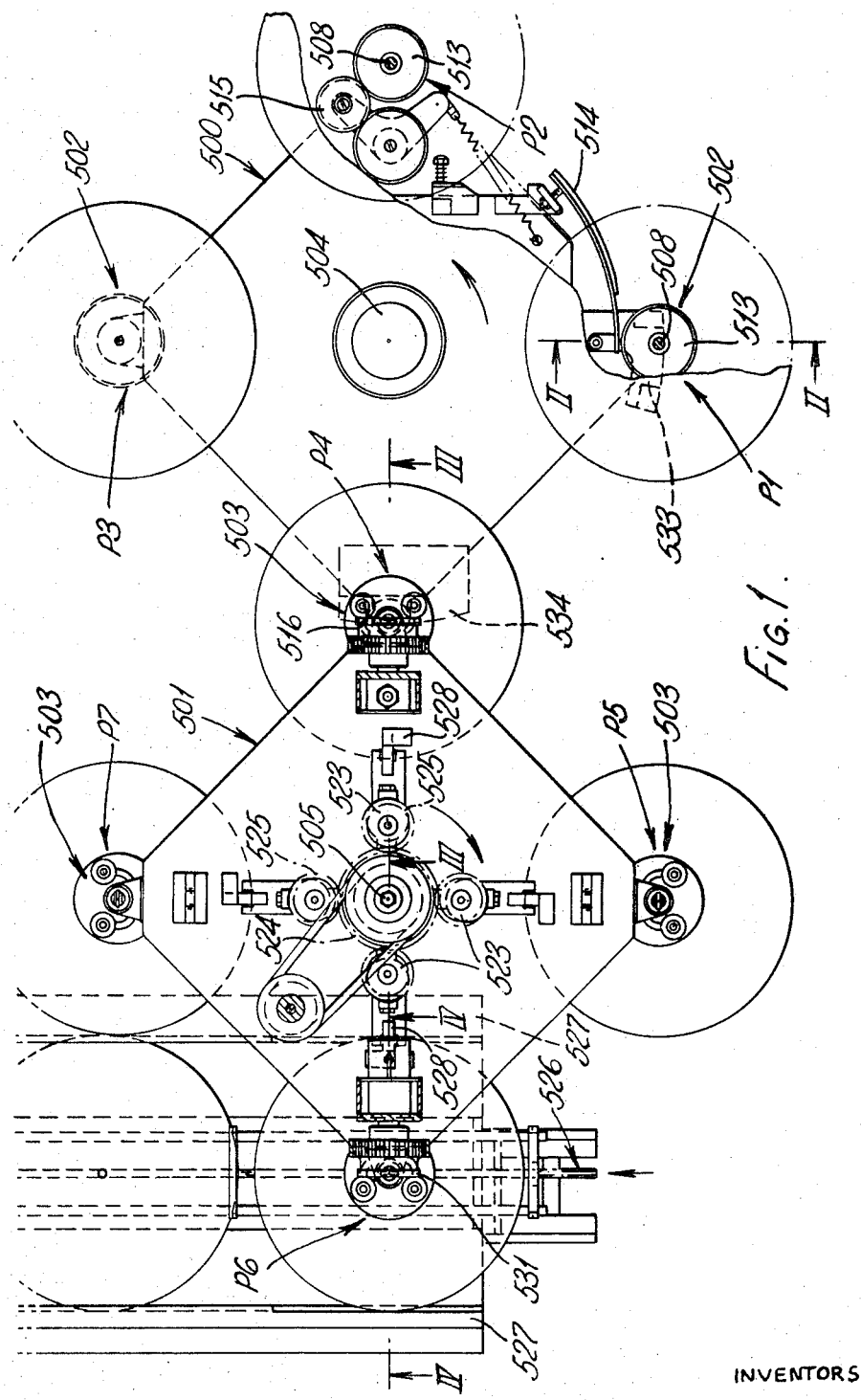

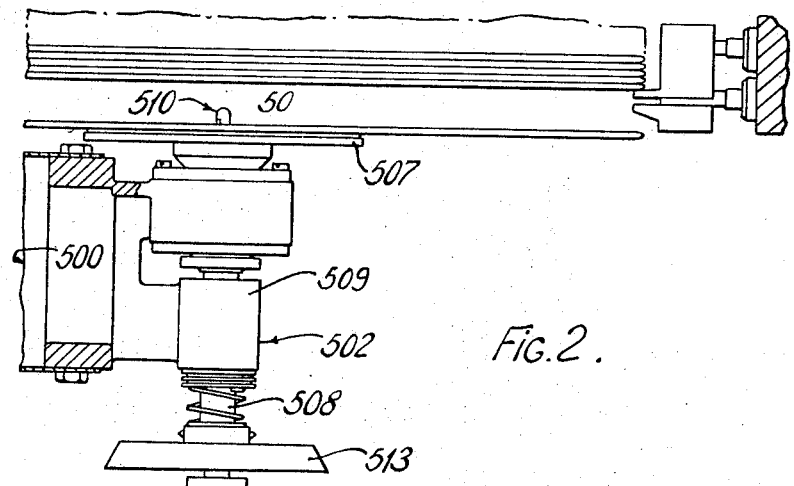
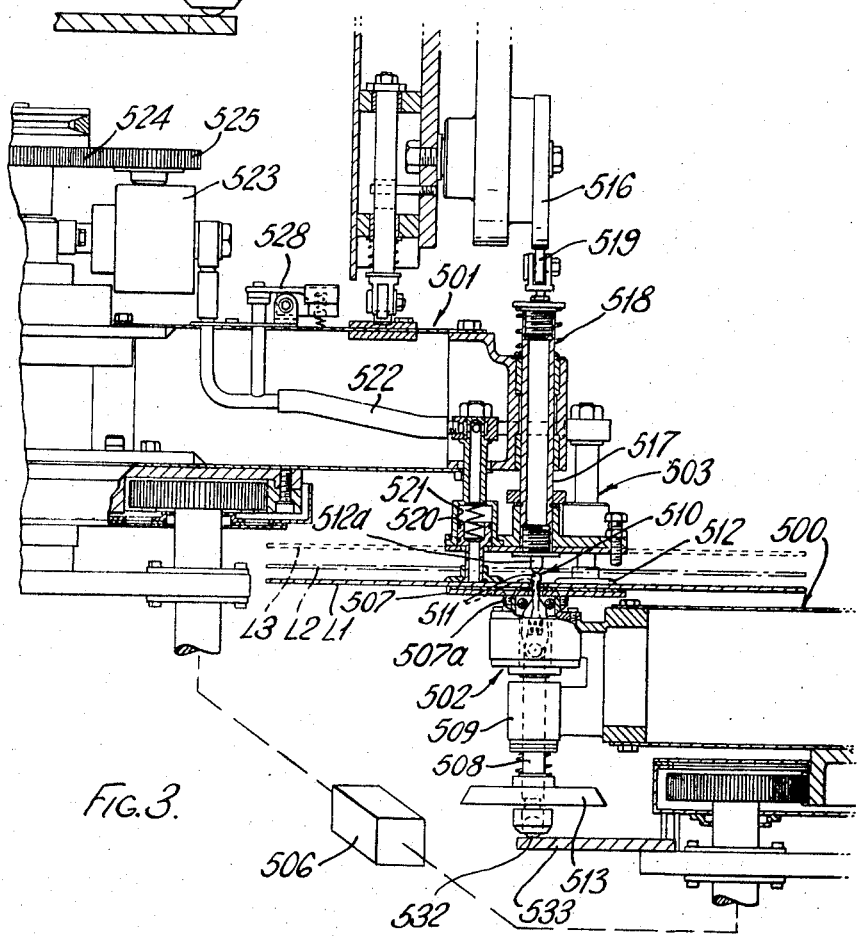

PATENTED MAY 1 1973
3,730,356
SHEET 3 OF 3
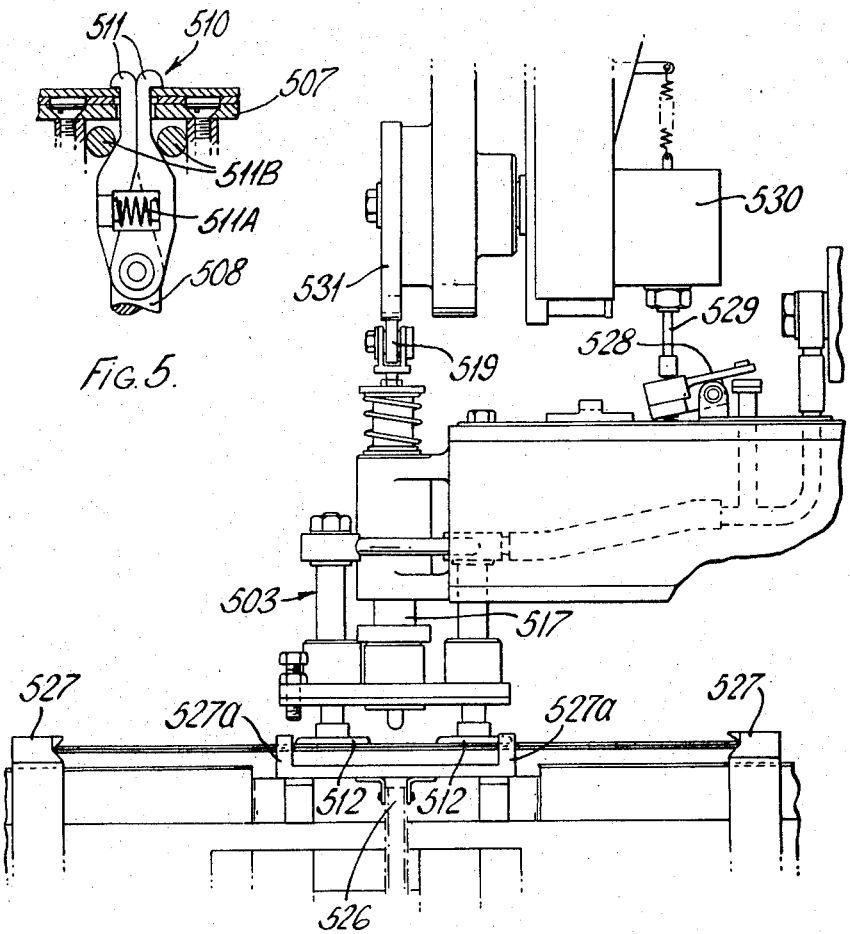
Fig. 5.
Fig. 4.
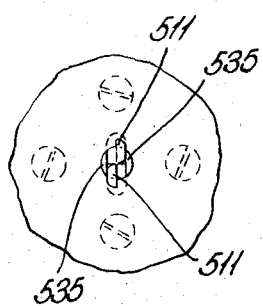
Fig. 7.
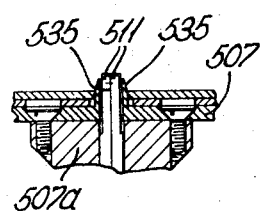
Fig. 6.
INVENTORS
WALTER HOWARD BOSSONS
DAVID GEORGE PARKER and GEORGE DAVEY BURCHER
BY Craig, Antonelli & Hill
ATTORNEYS

ARTICLE PRESENTING APPARATUS

This invention relates to apparatus for presenting gramophone records, or like articles, to inspection devices. The present invention may with advantage be employed in a record packing machine as disclosed in U.S. Pat. application No. 36,261 filed May 11, 1970, now U.S. Pat. No. 3,657,858.

According to the invention, we provide apparatus for presenting records or like articles to inspection devices, comprising a first presenting device arranged to support a record or like article by engagement with one face thereof and to move said record past at least one device for inspection of its other face, and a second presenting device arranged to support the record or like article by engagement with said other face and move said record past at least one device for inspection of said one face.

Conveniently said first and second presenting devices each includes a conveyor means, means for driving said conveyor means, at least one support means mounted on said conveyor means and having a surface for supporting a record thereon, the conveyor means of said first and second presenting devices being driven in synchronism and positioned such that said support means of each conveyor means are brought to a transfer position in which said record engaging surfaces of each support means are opposite each other once during each revolution of each of said conveyor means.

In a particularly preferred form the first presenting device is arranged to support records from below and the second presenting device is arranged to receive records from said first presenting device and to support such records from above. The first presenting means may then conveniently have support means in the form of a disc and means associated with said disc for retaining a record or like article thereon, while the second presenting device may have support means embodying suction pads.

Apparatus embodying the invention may also include a variety of other features, as will be seen from the following description of one preferred form of apparatus. Reference will be made to the accompanying drawings in which:

FIG. 1 is a plan view of apparatus for transporting records past a succession of inspection devices, FIG. 2 is a section taken on the line II—II of FIG. 1, FIG. 3 is a section taken on the line III—III of FIG. 1, FIG. 4 is a section taken on the line IV—IV of FIG. 1, FIG. 5 is a detail of FIG. 3 but with parts thereof shown in a different position, FIG. 6 shows in section a modification to part of the apparatus of FIG. 3, and FIG. 7 is a plan view of the modification of FIG. 6.

The preferred form of apparatus is shown as part of a machine for packing records in a sleeve, and serves to carry records one at a time past a succession of inspection devices so that the records are successively presented for inspection by said devices; the records then are fed selectively to either a device for inserting them into a bag, or a reject station, under the control of said inspection devices.

In this apparatus the records are carried round a path generally in the form of a slightly incomplete figure-eight. To effect this, the apparatus includes two rotatable heads 500, 501; the head 500 has four record-carrying members 502 and head 501 has four record-carrying members 503. The heads 500, 501 are fixed to shafts 504, 505 respectively which are driven intermittently in 90° steps from a drive unit diagrammatically shown in FIG. 3 at 506. The members 502 on the head 500 are disposed to support a record above each record-carrying member while the corresponding members 503 on the head 501 are each arranged to support a record below the record-carrying member. The purpose of this difference is to allow the upper surface of records to be inspected while they are carried by record-carrying members 502 of the head 500 and the lower surface of records to be inspected while they are carried by record-carrying members 503 of the head 501.

On the head 500, each record carrying member 502 comprises an upward-facing disc 507 carried by housing 507a. A shaft 508 is rotatably supported by and slidable in a bearing 509, and carries at its upper end a central projection 510 to engage through the central hole of a record placed thereon. Said central projection is in the form of two hooked and spreadable catch members 511, which can be inserted through the center hole of a record and then spread, as shown in FIG. 5, to ensure retention of the record on the record-carrying member in a properly centered position.

As is most clearly seen in FIG. 5, the catch members 511 are urged apart by a compression spring 511A and thus tapered portions of the members 511 are maintained in contact with two abutments 511B. Whenever the members 511 are raised by movement of the shaft 508, interaction between the tapered portions of the members 511 and abutments 511B cause the members 511 to be closed together while lowering of the shaft 508 permits the spring 511A to spread the members 511. Because of the hooked configuration of the tops of the members 511, in the spread condition (with shaft 508 lowered) they serve to retain the record against the disc 507, while when closed (with shaft 508 raised) they allow the record to be placed upon or removed from the disc 507.

The record-carrying members 503 of the head 501 have to support a record from above, so that its lower surface may be inspected, and each has a group of three downwardly-facing suction pads 512, disposed symmetrically about a central downwardly facing projection 512a which engages the center hole of a record supported by the pads 512.

As each record-carrying member 502 of the head 500 comes below a small stack of records, shown in FIG. 2, the lowest record of that stack is dropped on to the member 502, the central projection 510 engaging through the central hole of the record. The mechanism for thus dropping records operates in a similar manner to that described and illustrated in copending application Ser. No. 140,507 of even date and entitled "Improvements in Apparatus for Releasing Articles from a Stack." In FIG. 1 the reference P1 shows the position at which the record is dropped on to the member 502. Once the record is upon the member 502, the head 500 rotates 90° counter-clockwise (as viewed in FIG. 1) to present a further member 502 in position P1 to receive the next following record. As the head 500 starts to rotate a cam follower 532, carried on the shaft 508 at the opposite end to the central projection 510, runs off a fixed cam 533 which causes the shaft 508 to slide downwardly a short distance, which in turn causes the catch members 511 to spread, as mentioned above. During this 90° rotation of the head 500, a wheel 513, fixed to the shaft 508, engages and rolls along a stationary rail 514 thus causing shaft 508 and disc 507 to rotate on their own axis so that the record on disc 507 is revolving on completion of said 90° movement. With the head 500 in this position the first mentioned record has reached position P2 of FIG. 1 and the revolving movement is maintained by engagement between the wheel 513 and a constantly rotating driving wheel 515. While the next following record is being received by the head 500, the first record delivered thereto is undergoing inspection and when said next following record having been duly received upon its corresponding member 502, the head 500 makes a further 90° counter-clockwise rotation, the first-mentioned record is brought to a position P3, FIG. 1, at which it undergoes further inspection and then when yet another record has been placed on a third member 502, subsequent 90° rotation of the head 500 brings the first-mentioned record to a position P4, FIG. 1, at which the member 502 of head 500 which carries it is below a member 503 of head 501. At the position P4, the first-mentioned record is transferred to the head 501, the member 503 of head 501 being lowered slightly to bring suction pads 512 of the member 503 of the head 501 into contact with the record, and suction being applied to those pads. Just prior to the member 502 coming to rest at position P4 the cam follower 532 engages a fixed cam 534 which causes the shaft 508 to slide upwardly a short distance which in turn causes the catch members 511 to close and thus release the record so that it is free to be transferred to the member 503.

On stopping at position P4 the member 503 is positioned under a cam 516 which is rotated to cause the said lowering of the head 501. The cam 516 also permits a corresponding lift of the member 503 before it leaves the position P4, the member 503 being carried by a tubular spindle 517 which is vertically slidable and biased upwardly by a spring 518 to maintain a follower 519 at its upper end against cam 516 while the record is being transferred from the member 502 to the member 503. An additional lift is given to the suction pads relative to the rest of the member 503, by mounting each suction pad on a small piston 520 movable in a cylinder 521 forming part of the member 503, suction being applied to the pad through said cylinder and a hollow piston rod via suction pipe 522 from a continuously operating pump 523; with this arrangement, once suction is applied and a record engages the pad, pressure drop in the cylinder 521 lifts the piston 520 and hence the pad relative to the cylinder and the rest of the member 503. The pumps 523 of all the members 503 are driven by a sun wheel 524 engaged with individual driven gears 525 on the several pumps.

The arrangement is such that when the member 502 stops at position P4 the record carried thereon is at a level shown at L1 in FIG. 3. The record is then firstly lifted to the level L2, shown in chain dot line in FIG. 3, by reason of the pistons 520 moving in their respective cylinder 521, and secondly lifted to the level L3, shown in dotted lines in FIG. 3, by reason of the cam follower 519 engaging the cam 516, as described above. The effect of these movements is to disengage the record from the central projection 510 of the member 502 and engage it with the projection 512a on the member 503.

Once this transfer is accomplished the head 501 rotates through 90° clockwise which brings the record to position P5 of FIG. 1, where its undersurface is inspected. At the same time the head 500 also rotates a further 90° which will bring the member 502 from which the first-mentioned record has just been received back to position P1 ready to receive another record; as this member 502 starts to move away from position P4 the cam follower 532 runs off the fixed cam 534 so as to cause the catch members 511 to spread again as described previously. This is so as to re-grip any record which, for some reason, has not been transferred to the member 503 of the head 501. As the member 502 approaches position P1 the cam follower 532 engages the cam 533 to close the catch members 511. If a record is already present on the disc 507, then control devices (not shown) prevent a further record from being dropped on to the disc 507. When the head 501 makes a further 90° rotation, the record is brought to a position P6 at which it is released, by terminating the supply of suction to the pads of the member 503, and drops slightly to a conveyor device 526 (FIGS. 1, 4), providing channels 527 for engaging the edges of the record clear of its playing surface, and pushers 527a to propel the record towards the position at which the inner bags are presented to receive records. Suction is cut off from the pads of each member 503 at the position P6 by venting the associated pipe 522 to atmosphere through a valve 528, which at this time is in alignment with operating plunger 529 of a solenoid 530 (FIG. 4) which is attached to a fixed part of the machine and does not rotate with the head 502. The fall of the record on conveyor device 526 is minimized by lowering the member 503, a further cam 531 engaging follower 519 for this purpose. It should be noted that both of the cams 516, 531 continuously rotate on fixed axes and are only operative (i.e. in contact with one of the followers 519) whilst the head 501 is stationary.

However, each record is only deposited on to the conveyor device 526 if during the inspection operations performed on it while it is being carried by the head 500, 501 no fault justifying rejection of the record has been found. In the event such a fault is found, suction is maintained (i.e. plunger 529 is held up) on the pads of the member 503 of head 501 carrying that record when the latter is brought above the conveyor 526 and such suction is maintained until the head 501 has made a further 90° clockwise rotation and the record is carried to position P7 of FIG. 1. Suction is then released by a further solenoid (not shown) similar to the solenoid 530 and the record drops off the head 501 into a suitable bin or hopper (not shown) for faulty records.

So that the record may be more accurately positioned on the disc 507 of the member 502 two small upwardly facing projections 535 may be formed on the disc, as shown in FIGS. 6 and 7, and as seen in plan (FIG. 7) are in the shape of segments of a circle, the circle being of such a diameter that the projections prevent lateral movement of the record on the disc 507 before the record is gripped by the catch members 511. The catch members 511 are arranged to operate between the two projections 535.

It will have been noted in the discussion of heads 500 and 501 that while each record is on the head 500 it is brought to two positions at which it is inspected while when it is on the head 501 there is only one inspection position. Conveniently, at the first inspection position while the record is on head 500 inspection for warp and concentricity of the record is effected, and also the record is cleaned in preparation for inspection of its upper and lower surfaces, these inspections being effected with the record revolving.

At the second inspection position while the record is on head 500, the upper surface of the record is inspected as desired and similar inspection of the lower surface of the record is performed while the latter is at the single inspection position during its support by the head 501, the inspections being performed with the record stationary, but a suitable scanning of its surface being effected by the inspection devices.

What we claim as our invention and desire to secure by Letters Patent is:

1. Apparatus for presenting records to inspection devices, comprising a first presenting device arranged to support a record by engagement with one face thereof and to move said record past at least one device for inspection of its other face, and a second presenting device arranged to support the record by engagement with said other face and to move said record past at least one device for inspection of said one face, said first and second presenting devices each including conveyor means, means for driving said conveyor means, and at least one record support means mounted on said conveyor means, the conveyor means of said first and second presenting devices being driven in synchronism and so positioned that said support means of each conveyor means are brought to a transfer position in which said record engaging surfaces of each support means are opposite each other once during each revolution of each of said conveyor means, in which the support means of one of said presenting devices is in the form of a disc of diameter not exceeding that of a record to be supported thereabove and means associated with said disc for retaining a record thereon, and the support means of the other of said presenting devices is in the form of a group of suction pads symmetrically disposed about a central projection adapted to engage in the central hole of a record held below said pads.

2. Apparatus as claimed in claim 1 in which each of said conveyor means comprises a head mounted for rotation about a central axis by said driving means, said head having mounted thereon four support means placed symmetrically about said central axis.

3. Apparatus as claimed in claim 2 in which said drive means is arranged to drive said conveyor means intermittently in 90° steps.

4. Apparatus as claimed in claim 1, in which said retaining means is adapted to hold a record with a central hole against said disc and comprises a pair of hooked catch members carried at one end of an axially-movable shaft extending at right angles to the plane of said disc, said catch members extending through a central slot in said disc and through the central hole of any record placed thereagainst and being spreadable to engage the surface of the record remote from the disc to retain the record in engagement with the disc and in coaxial relation to said shaft.

5. Apparatus as claimed in claim 4, in which said disc has two projections disposed symmetrically on either side of its central slot, said projections being so dimensioned as to fit within the central hole of any record placed thereagainst to prevent lateral movement of the record on the disc.

6. Apparatus as claimed in claim 5, in which the end of the axially-movable shaft remote from said catch members carries a cam follower engageable with a fixed cam to produce axial movements of the shaft in response to movements of the conveyor means.

7. Apparatus as claimed in claim 6, in which the axially-movable shaft is freely rotatable and carries a wheel engageable with a stationary rail during part of the movement of the conveyor means so as to cause rotation of the shaft and the disc together with any record held thereagainst.

8. Apparatus as claimed in claim 7, in which said drive means is arranged to drive said conveyor means intermittently in 90° steps and said fixed rail is so disposed as to be engaged by the wheel of each support means during movement of that support means through one of the 90° steps and a constantly rotatable driving wheel is arranged to be engaged by the wheel of each support means while the latter is stationary prior to the next following 90° step of movement.

9. Apparatus as claimed in claim 1, in which each of said suction pads is mounted by means of a hollow piston rod upon a piston slidable in a cylinder, means being provided for applying suction to said pad through said cylinder and hollow piston rod so that when a record is against said pads such application of suction causes the pistons to move into their cylinders and simultaneously causes the pads to grip the record and move it with them.

10. Apparatus as claimed in claim 9, in which each of the support means comprising a group of suction pads is movable to and fro parallel to the axis of said projection, each such support means including a cam follower coacting with a rotatable cam arranged to produce such to and fro movements, said rotatable cam being so placed as to be engaged by each cam follower whenever the conveyor means brings the support means containing that cam follower to the transfer position.

11. Apparatus as claimed in claim 10, including a further rotatable cam engageable by each cam follower when its support means is at a discharge position other than the transfer position, the means for applying suction to the pads being adapted to discontinue such application of suction to the pads of that support means while the latter is at said discharge position.

* * * * *

UNITED STATES PATENT OFFICE
CERTIFICATE OF CORRECTION

Patent No. 3,730,356　　　　Dated May 1, 1973

Inventor(s) Walter H. Bossons, et al.

It is certified that error appears in the above-identified patent and that said Letters Patent are hereby corrected as shown below:

Assignee omitted.  Should read:

-- Masson Scott Thrissell Engineering Limited --

Signed and sealed this 9th day of July 1974.

(SEAL)
Attest:

McCOY M. GIBSON, JR.　　　　　　　C. MARSHALL DANN
Attesting Officer　　　　　　　　Commissioner of Patents